United States Patent [19]

Neufeld

[11] 4,359,197
[45] Nov. 16, 1982

[54] SILENT-SELECTIVE ANTI-REVERSE MECHANISM

[75] Inventor: Henry L. Neufeld, Tulsa, Okla.

[73] Assignee: Brunswick Corporation, Skokie, Ill.

[21] Appl. No.: 112,958

[22] Filed: Jan. 17, 1980

[51] Int. Cl.³ .............................................. A01K 89/02
[52] U.S. Cl. .............................. 242/84.5 A; 188/82.3; 188/82.4; 74/576
[58] Field of Search ................ 242/84.2 A, 84.2 R, 242/84.2 G, 84.2 F, 84.21 R, 84.21 A, 84.5 A, 84.5 R, 84.51 R, 84.51 A, 84.1 R; 188/82.3, 82.34, 82.4; 74/576

[56] References Cited

U.S. PATENT DOCUMENTS

| | | | |
|---|---|---|---|
| 1,799,017 | 3/1931 | Junghans | 74/576 |
| 1,811,073 | 6/1931 | Burdick | 74/576 |
| 3,061,230 | 10/1962 | Gayle | 242/84.5 A |
| 3,143,315 | 8/1964 | Harrington et al. | 242/84.21 A |
| 3,481,554 | 12/1969 | Hull | 242/84.2 A |
| 4,154,413 | 5/1979 | Hull | 242/84.2 A |
| 4,156,510 | 5/1979 | Hull | 242/84.2 A |
| 4,163,528 | 8/1979 | Egasaki et al. | 242/84.51 A |
| 4,172,566 | 10/1979 | Noda | 242/84.2 A |

Primary Examiner—Billy S. Taylor
Attorney, Agent, or Firm—John G. Heimovics

[57] ABSTRACT

This invention comprehends a spin casting style fishing reel that has an anti-reverse mechanism that prevents the crank assembly from being rotated in the reverse direction when desired. The anti-reverse mechanism is silent in operation and can be selectively placed into or taken out of operation. In miniature sized reels, the switch to engage or disengage the anti-reverse mechanism can be handably mounted on the side of the fishing reel.

23 Claims, 7 Drawing Figures

2ND POSITION
ON

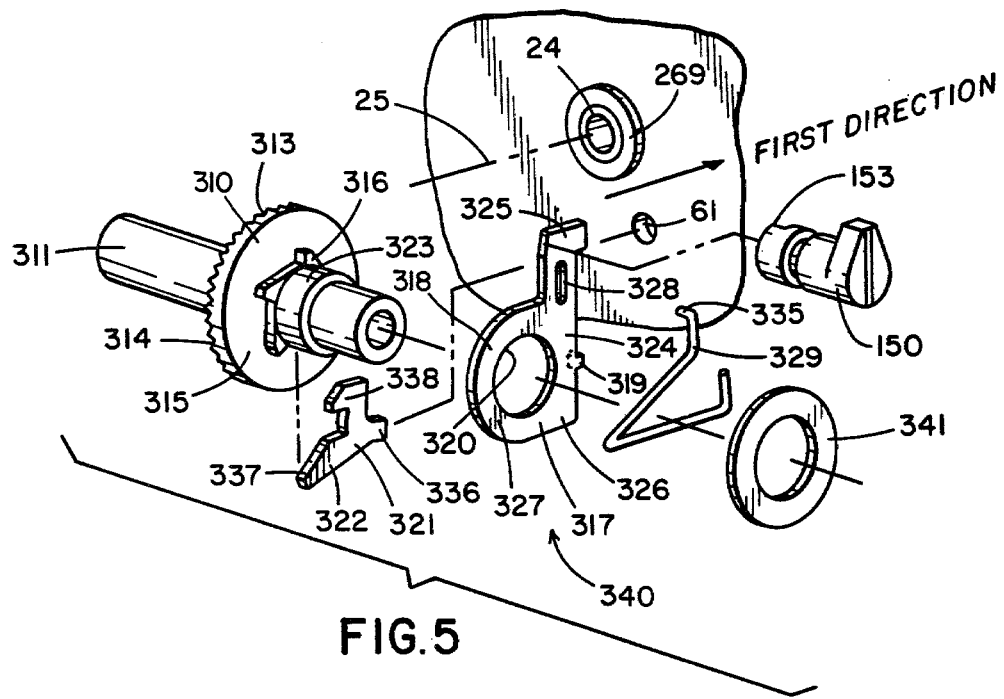
FIG. 5
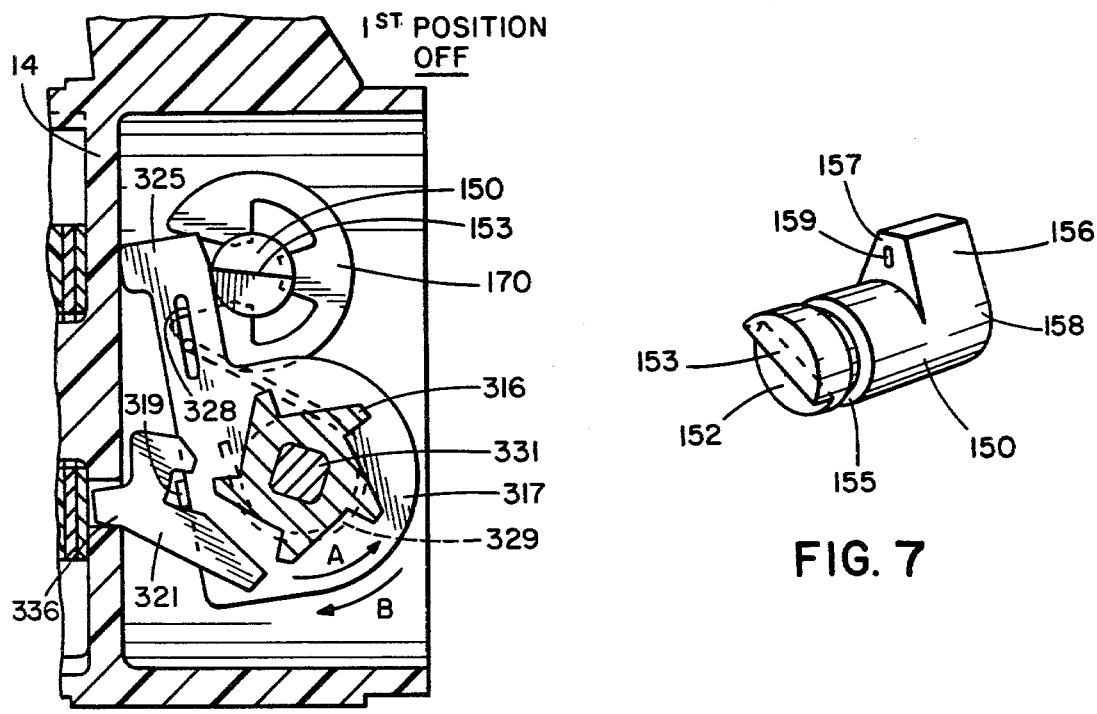
FIG. 6
FIG. 7

SILENT-SELECTIVE ANTI-REVERSE MECHANISM

BACKGROUND OF THE INVENTION

1. Field of the Invention

This invention relates to fishing reels, and more particularly, relates to spin casting style fishing reels that have crank shafts that can rotate in both the forward and reverse directions. This invention permits the fisherman to decide if he wants to operate the crank shaft in only the line reeling operation.

2. Background of the Prior Art

Although there are many anti-reverse devices employed in prior art fishing reels, the generally accepted type of such mechanism found in spin casting reels is mounted on the center shaft which is also used to rotate the spinner head to wind fishing line around and on to the spool. Since the center shaft is both slidable and rotatable—both forward and reverse—the anti-reverse mechanism must also be slidably on the center shaft. This arrangement generally increases the cost of the fishing reel and complicates the anti-reverse mechanism. This complicating feature is even more undesirable when a selective anti-reverse mechanism switch is incorporated therewith. The anti-reverse mechanism mounted on the center shaft also competes for space within the fishing reel housing and is therefore obviously misplaced. Thus, the need for a selective anti-reverse mechanism, mounted on the crank shaft rather than the center shaft is obvious since the advantages gained thereby would be many.

SUMMARY OF THE INVENTION

This invention relates to the spin casting style fishing reel and comprehends a very smooth operating anti-reverse mechanism that is mounted on the crank shaft of the spin casting reel. The ability to bring the mechanism into play or to cancel its operation is an added feature of the invention.

It is therefore an object of the invention to provide a unique anti-reverse mechanism that is mounted on the crank shaft and not the center shaft as found on most of the prior art fishing reels.

It is another object of such an invention to utilize a crank shaft assembly having a face gear with an anti-reverse ratchet mounted on the opposite side thereof in order to conserve space.

It is still another object of such an invention to provide an anti-reverse lever that controls a pawl means mounted on the housing plate of a spin casting reel that is engageable with the anti-reverse ratchet.

It is still yet another object of such an invention to provide a unique triangular shaped spring for operating the anti-reverse lever.

It is yet another object of this invention to provide a unique switch that activates or deactivates the anti-reverse mechanism, is operable by easy movement, and is mounted on the side of the fishing reel.

The above and other and further objects and features will be more readily understood by reference to the following detailed description and drawings.

DETAILED DESCRIPTION OF THE DRAWINGS

FIG. 5 is an exploded perspective view of the unique anti-reverse mechanism described herein;

FIG. 6 is a cross-sectional view of a back portion of the fishing reel with the anti-reverse mechanism in the OFF position; and FIG. 7 is a perspective view of the actuator switch that is used to control the position of the anti-reverse mechanism.

DESCRIPTION OF THE PREFERRED EMBODIMENT

Figure 1:
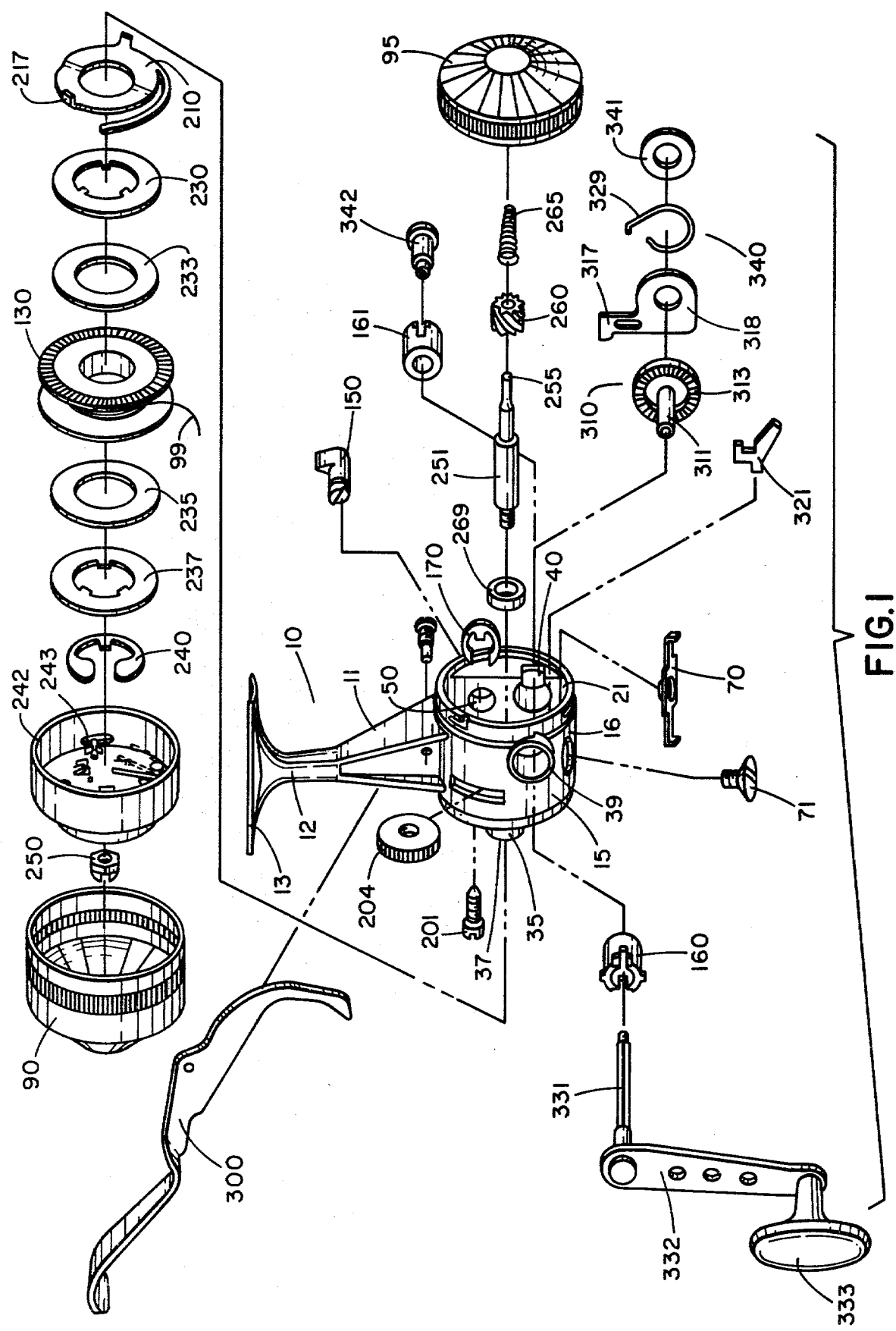
FIG. 1 is an exploded perspective view of the spin casting style reel containing the invention described herein.
Figure 2:
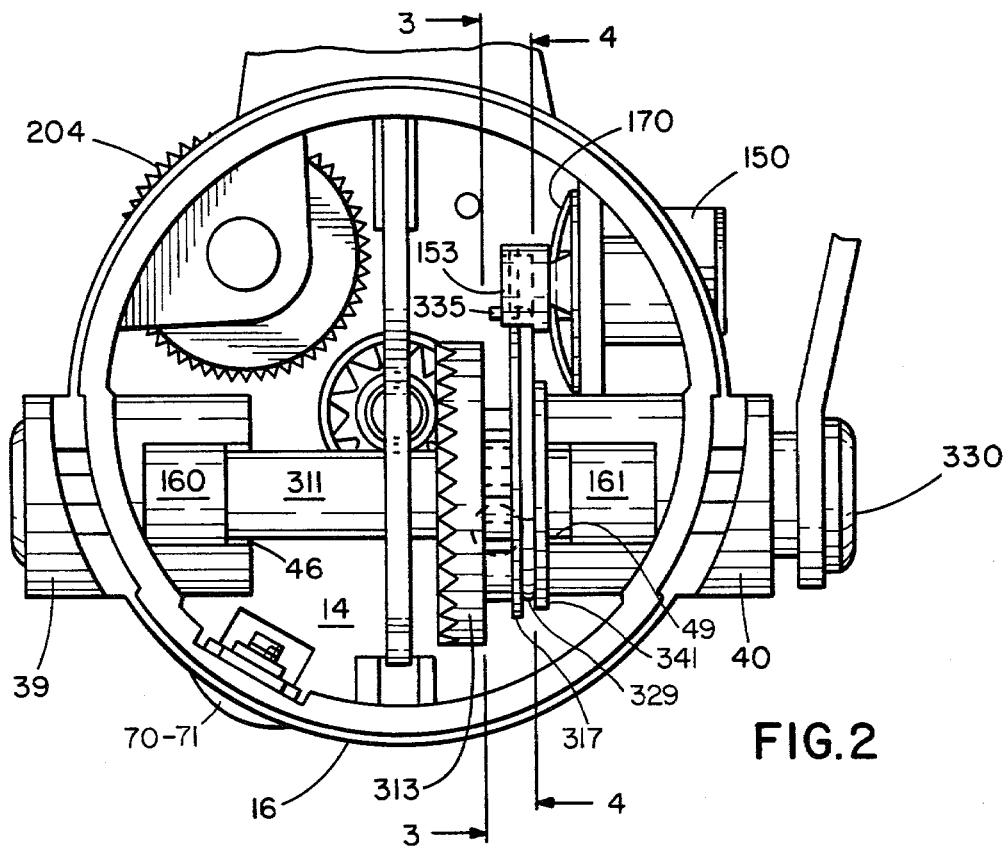
FIG. 2 is a rear view elevation of the back of the fishing reel incorporating the invention hereof.

In a fishing reel 10 of the spin casting type containing the preferred embodiments of the invention, FIG. 1 generally depicts an exploded perspective view of such a reel. A housing 11, preferably made of a plastic material such as acrylonitrile butadyene styrene (ABS) or glass-filled polycarbonate, has a center deck plate 14 with a forward and rear body portions 15 and 16. A central hub 35 projects forward of the deck plate 14 with a drag plate 210, back spool washer 230, back flat drag washer 233, spool assembly 130, front flat drag washer 235, front spool washer 237, all secured to the hub 35 by means of spool retainer clip 240 which fits into a groove (not shown in FIG. 1). A center shaft 251 is mounted in a hole (not shown in FIG. 1) in hub 35 with the spinner head 242 mounted on the forward threaded end of the shaft 251 by means of nut 250. The spinner head 242 partially surrounds the forward flange of the spool 130 with fishing line 99 being wound thereon. A front cover 90 secured on the first forward body portion 15 has a front hole (not shown in FIG. 1) which acts as a fishing line guide as the line is cast from the reel and rewound after casting.

A clutch head screw 201 is mounted in the interior 21 of the second body portion 16 with clutch wheel 204 mounted on screw 201. Tab 217 fits into the head of screw 201 and when the clutch wheel 204 is revolved upward toward stem 12 and screw 201 advances forward toward the spool retainer clip 240 increasing the clamping force on the spool 130 so that the ability of spool 130 to revolve relative to the hub 35 is decreased. When the wheel 204 is revolved away from the stem 12, the clamping force is decreased and the spool 130 is permitted to revolve relative to hub 35 thus creating the drag mechanism for the fishing reel 10. The center shaft 251 is slidably and rotatably mounted in bearing 269 which is mounted in the deck plate 14. Slidably mounted on center shaft 251 in the second body portion is pinion gear 260 and maintained in place by the center shaft spring 265.

A finger brake lever 300 is mounted on the housing 11 exterior the first body portion 15 and inside the second body portion 16 and being in operable contact with the distal end 255 of the shaft 251. When the exterior portion of the lever 300 is pulled upward toward the mounting foot 13, the center shaft 251 and the spinner head mounted thereon are pushed forward relative to the bearing 269 and the hub 35. The pickup pin mechanism 243 mounted on spinner head 242 cooperates with the cam 37 mounted on the face of hub 35 to maintain the spinner head 242 in a forward position. In this forward position the fishing line 99 can be cast from the reel 10.

Crank year 310 is coupled with the anti-reverse assembly 340 which comprises a ratchet (on the back side of face gear 313 and not shown in FIG. 1), an anti-reverse drag arm 317, a drag spring 329 and spacer washer 341 all mounted on the hollow crank shaft 311. An anti-reverse pawl 321 is mounted in the deck plate 14 and received in between the back of the face gear 313 and drag arm 317 for engageable and disengageable contact with the ratchet. The crank gear 310 is mounted in bearing supports 39 and 40 by sliding between slots in the supports 39 and 40. Crank bearings 160 and 161 mounted in supports 39 and 40 provide suitable bearings for the hollow shaft 311. A crank rod 331 is slip fitted into the hole in shaft 311 and keyed thereto. Crank rod nut 342 is secured to the threaded end to fasten rod 331 to the reel 10. The rod 331 is connected to the crank handle 332 and crank knob 333. The gear 313 is in engageable contact with pinion 260 so that when the crank handle 332 and knob 333 are rotated in the forward direction (toward the front cover) the crank shaft 251 rotates causing the spinner head 242 to rotate as well. This rotative motion disengages the pickup pin mechanism 243 from the hub 35 cam 37 causing the spinner head 242 and shaft 251 to move rearward. This same motion causes the pickup pin of the mechanism 243 to extend outwardly beyond the spinner head 242 so that the fishing line 99 can be wound on the spool 130.

Anti-reverse actuator 150 is mounted in upper housing hole 50 and retained therein by retainer clip 170. The actuator 150 is in cooperative contact with the anti-reverse drag arm 317. In one position the actuator 150 disengages the anti-reverse assembly 340 permitting the crank rod 331 and the crank assembly to rotate in either the forward direction (upward toward the stem 12) or the reverse direction (downward from the stem 12 toward the back of the reel).

A back cover 95 is secured on the second back portion 16 to enclose the reel 10. Cover lock 70 is mounted within the housing 11 and is tightened in place by screw 71 clamping the covers 90 and 95 to the housing.

Figures 3, 4:
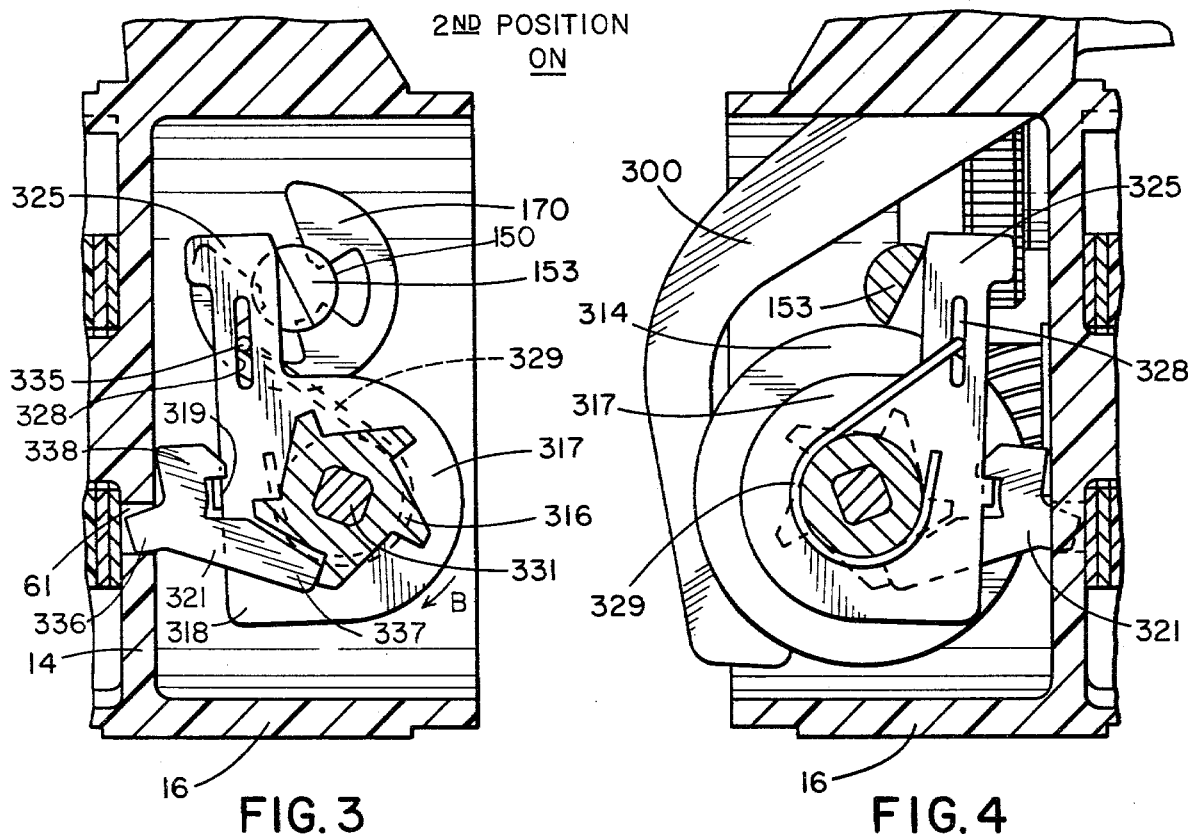
FIG. 3 is a cross-sectional view taken along line 3—3 as shown in FIG. 2.
FIG. 4 is a cross-sectional view taken along line 4—4 as shown in FIG. 2.

In a prefered embodiment of the invention depicted in FIG. 5, the device for permitting the rotation of the crank handle in a forward or first direction is shown. The "forward" or "first direction" is defined as "the crank assembly handle rotating first toward the stem 12 and then toward the front cover 90" or in a "counter-clockwise direction when the crank is viewed from its position in FIG. 1". The "reverse" or "second direction of rotation" is defined as being opposite to the first direction. A pawl means 321 which is Y-shaped 322 comprises a yoke divided into a lower or first fork 337, an upper or second fork 338 and a lower leg 336. The lower leg is mounted in hole 61 in the deck plate 14. The forks 337 and 338 project rearwardly from the plate 14 as shown in FIGS. 3, 4 and 6. The crank gear 310 with the anti-reverse means is mounted on hollow crank shaft 311. Face gear 313 is integral with the shaft 311 and contains the internal gear 314 and the opposite outer face 315. Part of the outer face 315 comprises ratchet 316. Adjacent to ratchet 316 is an enlarged shaft portion 323 (FIG. 5) for mounting the anti-reverse drag arm 317, its actuator spring 329 and spacer washer 341. The shaft 311 of the crank gear 310 slip fits into the slots 46 and 49 of the housing 11 whereupon bearing 160 and 161 are inserted in the bearing supports 39, 40 over the ends of the shaft 311 so that pawl means 321 is in corporative relationship with the ratchet 316, as shown in FIGS. 3, 4 and 6. The loop 327 of the b-shaped lever 318 has tab 319 that fits into the parting between the forks 337 and 338 on pawl 321. In the upper extension 325 of the drag arm 317 is a slot 328 that receives the bent end 335 of the spring 329. The actuator 150 has a stem 151 with cam 153 on the distal end 152 and the proximal end 158 is secured to the head 156. The head 156 has a flat underside 157 that bears against the exterior reel housing. Retainer clip 170 fits into undercut groove 155 to keep the actuator biasibly mounted in the reel 10.

As shown in FIG. 6, when the actuator 150 is in the OFF position, cam 153 forces the upper end 325 against the deck 14. In this position, the tab 319 pushes down on the first fork 337 preventing any contact of the pawl 321 with the teeth of the ratchet 316. Thus, the shaft 311 and its core crank rod 331 can rotate in either the first (forward) or arrow "A" direction or the second (reverse) or arrow "B" direction. When the actuator 150 is revolved to the ON position, as shown in FIG. 3, the spring 329 on shaft 311 applies a frictional force thereto and causes the bent end 335 riding in slot 328 and the drag arm 317 to start to rotate or revolve away from the deck plate 14. As this occurs, the tab 319 engages the second fork 338 forcing it upwards which brings the first fork 337 into contact with a tooth of the ratchet 316 preventing the crank shaft 311 from rotating in the second, reverse or "B" direction.

This arrangement of the anti-reverse drag arm 317 as part of the crank shaft assembly permits the center shaft 251 from being encumbered with another mechanism as those of the prior art. It has been found that the triangular shaped spring 329 shown in FIG. 5 is superior to the circular base spring 329 as shown in FIGS. 3, 4 and 6 when such an anti-reverse system is used in miniaturized reels.

The unique actuator device 150 is more fully described in my U.S. patent application Ser. No. 113,236, filed Jan. 11, 1980 entitled OFF/ON SELECTOR SWITCH FOR ANTI-REVERSE MECHANISM and is incorporated herein by reference.

It should be understood, of course, that the specific forms of the invention illustrated and described herein are intended to be representative only, as certain changes and modifications may be made without departing from the scope of the teachings herein disclosed. Accordingly, reference should be made to the appended claims in ascertaining the full scope of the invention.

What is claimed is:

1. In a spinning reel, a device for selectively permitting or preventing the reverse rotation of the crank handle, comprising:
 (a) a housing having a deck plate and body portions with exterior and interior surfaces, a first portion projecting forward of the deck plate and a second portion projecting rearward;
 (b) bearing means in the second portion and extending from the interior surface through the exterior surface;
 (c) a crank gear assembly mounted in the bearing means, the assembly comprising:
 (i) a crank shaft, (ii) a face gear mounted on the shaft having a back side, (iii) ratchet means mounted on the shaft adjacent the gear, (iv) anti-reverse drag means having a tab projecting parallel to the deck plate and being mounted on the shaft;

(d) pawl means mounted in the deck plate and directed toward the crank gear assembly and being engageable with the ratchet means, the tab engageable with the pawl means;

(e) a spring for urging the drag means to rotate in a first direction when the crank shaft rotates in a first direction and urging the drag means to rotate in a second direction when the crank shaft rotates in a second direction; and (f) said second direction of rotation of the shaft being prevented when the drag means starts to rotate in the second direction by causing the tab to move the pawl means to engage the ratchet means.

2. The reel of claim 1 wherein the bearing means comprises two bearings spaced apart with the face gear and ratchet means mounted therebetween.

3. The reel of claim 1 wherein the ratchet means is a ratchet wheel integrally formed on the part of the back side of the face gear.

4. The reel of claim 1 wherein the crank shaft has an enlarged portion adjacent the ratchet means for supporting said anti-reverse drag means.

5. The reel of claims 1 or 4 wherein the drag means is a thin b-shaped drag arm having an extension with upper and lower parts and a lower loop.

6. The reel of claim 5 wherein the drag arm has a slot in the upper part of the extension.

7. The reel of claim 6 wherein the spring has a bent end that is received in the drag arm slot.

8. The reel of claim 7 wherein the bent end of the spring points parallel to the deck plate.

9. The reel of claim 8 wherein the spring is triangular-shaped, is mounted on the crank shaft and makes three point contact therewith.

10. The reel of claim 1 wherein the pawl means is a modified Y-shape with a lower leg and first and second bifurcated forks.

11. The reel of claim 10 wherein the deck plate has a hole therein for mounting the pawl.

12. The reel of claim 11 wherein the lower leg of the Y-shape pawl is mounted in the deck plate hole.

13. The reel of claim 10 wherein the tab is mounted between the bifurcated forks.

14. The reel of claim 13 wherein the first fork is engaged by the tab and the pawl is disengaged from the ratchet means permitting the crank shaft to rotate in both first and second directions.

15. The reel of claim 14 wherein the second fork is spaced from the tab.

16. The reel of claim 13 wherein the second fork is engaged by the tab and the first fork is operable with the ratchet means thereby preventing the crank shaft from rotating in the second direction.

17. The reel of claim 9, further including an upper opening in said housing spaced from said bearing and an actuator mounted in the upper opening.

18. The reel of claim 17 wherein the actuator comprises:

(a) a stem having a cam surface on the distal end and a proximal end, (b) a head having a flat underside secured to the proximal end and an outer surface, the stem rotatably mounted in the upper opening with the under side of the head in contact with the exterior surface of the second portion.

19. The reel of claim 18 wherein the stem has an undercut groove near the cam surface and further including retainer means mounted in the groove.

20. The reel of claim 18 wherein the upper cam surface is in contact with the upper part of the extension of the drag means.

21. The reel of claim 20 wherein the actuator is rotatable from a first position to a second position and wherein when the actuator is in the first position, the upper stem is depressed toward the deck plate with the tab in contact with the first fork.

22. The reel of claim 21 wherein when the actuator is in the second position, the upper part of the extension of the drag means is permitted to rotate away from the deck plate with the tab in contact with the second fork and with the first fork engageable with the ratchet.

23. The reel of claim 22 wherein the crank shaft can only rotate in the first direction when the actuator is in the second position and the pawl is in engagement with the ratchet.

* * * * *